United States Patent
Hsu

(10) Patent No.: US 10,969,093 B1
(45) Date of Patent: Apr. 6, 2021

(54) ROTATABLE LAMP AND TWO CAMERAS FOR DETECTING MOVEMENT

(71) Applicant: Dong Guan Jia Sheng Lighting Technology Co., Ltd. China, Dong-Guna (CN)

(72) Inventor: Kevin Hsu, Taichung (TW)

(73) Assignee: DONG GUAN JIA SHENG LIGHTING TECHNOLOGY CO., LTD. CHINA, Guang-Dong (CN)

(*) Notice: Subject to any disclaimer, the term of this patent is extended or adjusted under 35 U.S.C. 154(b) by 0 days.

(21) Appl. No.: 16/747,026

(22) Filed: Jan. 20, 2020

(51) Int. Cl.
| | | |
|---|---|---|
| *F21V 14/02* | (2006.01) | |
| *H05B 47/125* | (2020.01) | |
| *F21V 23/04* | (2006.01) | |
| *F21V 21/30* | (2006.01) | |

(52) U.S. Cl.
CPC .......... *F21V 23/0478* (2013.01); *F21V 21/30* (2013.01)

(58) Field of Classification Search
CPC .... H05B 47/125; H05B 47/115; H05B 47/13; H05B 47/155; F21V 14/02; F21V 21/15; F21V 14/025
See application file for complete search history.

(56) References Cited

U.S. PATENT DOCUMENTS

| | | | | |
|---|---|---|---|---|
| 4,527,198 A * | 7/1985 | Callahan | .............. | H05B 47/155 348/722 |
| 5,023,709 A * | 6/1991 | Kita | ........................ | G01S 17/66 348/172 |
| 7,284,880 B1 * | 10/2007 | Steele | ..................... | F21V 21/15 362/234 |
| 8,232,909 B2 * | 7/2012 | Kroeger | .............. | F21V 23/0442 342/28 |
| 8,427,076 B2 * | 4/2013 | Bourquin | .............. | H05B 47/175 315/307 |
| 9,255,699 B2 * | 2/2016 | Wiegel | ............... | B65G 69/2882 |
| 9,539,952 B2 * | 1/2017 | Gebhard | ................. | B60R 11/00 |
| 10,120,267 B2 * | 11/2018 | Bonnier | ................. | G03B 15/07 |
| 2008/0186720 A1 * | 8/2008 | Verbrugh | ............. | H05B 47/155 362/383 |
| 2010/0001652 A1 * | 1/2010 | Damsleth | ............. | H05B 47/105 315/149 |
| 2015/0308642 A1 * | 10/2015 | Vo | ........................... | F21V 21/30 362/648 |
| 2019/0079496 A1 * | 3/2019 | Farnik | ..................... | F21V 21/15 |
| 2019/0087967 A1 * | 3/2019 | Walma | .................... | G06T 7/292 |

* cited by examiner

*Primary Examiner* — Ismael Negron
(74) *Attorney, Agent, or Firm* — Karin L. Williams; Alan D. Kamrath; Mayer & Williams PC

(57) ABSTRACT

A lamp includes a mounting portion secured to a wall, a fixed unit coupled to the mounting portion and having two cameras at an angle, a rotation unit rotatably mounted on the fixed unit and having a lighting device, and a motor configured to rotate the rotation unit in response to the cameras detecting movement of an object, and direct light from the lighting device towards the object.

8 Claims, 5 Drawing Sheets

ROTATABLE LAMP AND TWO CAMERAS FOR DETECTING MOVEMENT

BACKGROUND OF THE INVENTION

1. Field of the Invention

The present invention relates to an illuminating apparatus and, more particularly, to a lamp.

2. Description of the Related Art

A conventional human body detection lamp comprises a lighting unit and an infrared detector. When the infrared detector detects a message of a human body, the infrared detector sends a signal to trigger the lighting unit, such that the lighting unit is turned on and emits light beams toward the human body, to warn the invader. However, the infrared detector is not precise enough and is easily triggered erroneously. In addition, the infrared detector is even inoperative when being triggered. Further, the conventional human body detection lamp is not available for different installation environmental conditions.

BRIEF SUMMARY OF THE INVENTION

The primary objective of the present invention is to provide a lamp for detecting, tracing, and monitoring movement of a human body or an object.

In accordance with the present invention, there is provided a lamp comprising a housing, a camera, a lighting device, and a motor. The camera device, the lighting device, and the motor are mounted in the housing. The housing includes a mounting portion secured to a wall, a fixed unit mounted on the mounting portion, and a rotation unit rotatably mounted on the fixed unit and rotatable relative to the fixed unit. The camera device is mounted in the fixed unit of the housing. The camera device includes two camera heads with an angle defined therebetween. The lighting device is mounted in the rotation unit of the housing. In practice, when the camera device detects movement of a human body or an object, the camera device sends a message to trigger the lighting device and the motor, such that the motor is started to drive and move the rotation unit, and the lighting device is rotated in concert with the rotation unit, and is directed toward a moving direction of the human body or the object.

Preferably, the fixed unit of the housing includes a main shell and an annular end cap locked onto a top of the main shell, the main shell and the annular end cap form a receiving space, and the camera device is mounted in the receiving space.

Preferably, the fixed unit of the housing further includes a transparent plate mounted on the main shell, the main shell has a face provided with a window located opposite to the mounting portion, the transparent plate is mounted in the window of the main shell, and the camera device is arranged corresponding to the transparent plate.

Preferably, the camera device further includes two mounting plates with an angle defined therebetween, and two driving modules mounted on the two mounting plates 23 respectively, and the two camera heads are mounted on the two mounting plates respectively, and are connected to the two driving modules respectively.

Preferably, a power supply device mounted in the mounting portion of the housing, and electrically connected with the camera device and the lighting device by electric wires.

Preferably, the rotation unit includes a rear shell, a front shell combined with the rear shell, a light output portion mounted on the front shell, and a base mounted on the front shell, and the base is located at a bottom of the rotation unit, and encloses the lighting device in the rotation unit.

Preferably, the rear shell is provided with a locking block, and the lighting device includes a top plate secured to the locking block, a lamp holder mounted on the top plate, and a lampshade mounted on the top plate and covering the lamp holder.

Preferably, the motor is mounted in the fixed unit of the housing, and connected with the rotation unit of the housing, and the motor is provided with a propeller shaft mounted on the base.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
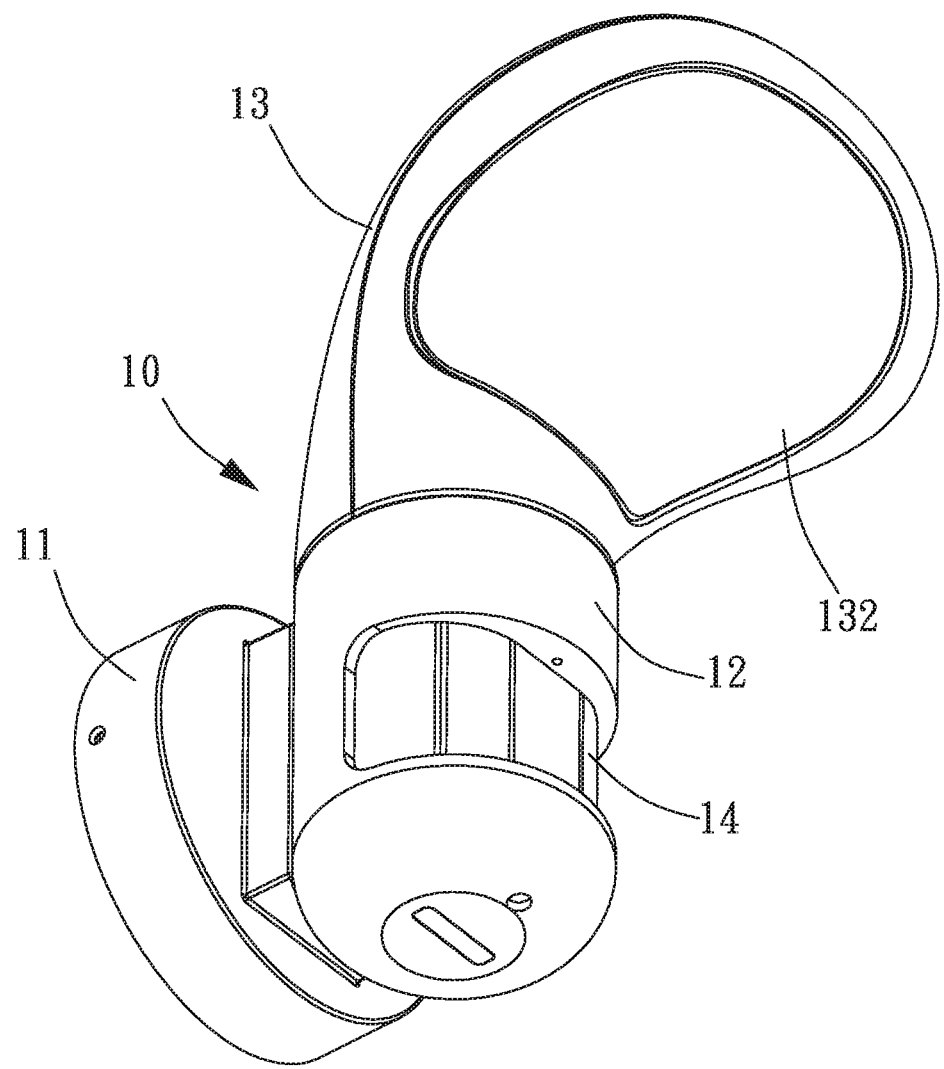
FIG. 1 is a perspective view of a lamp in accordance with the preferred embodiment of the present invention.
Figure 2:
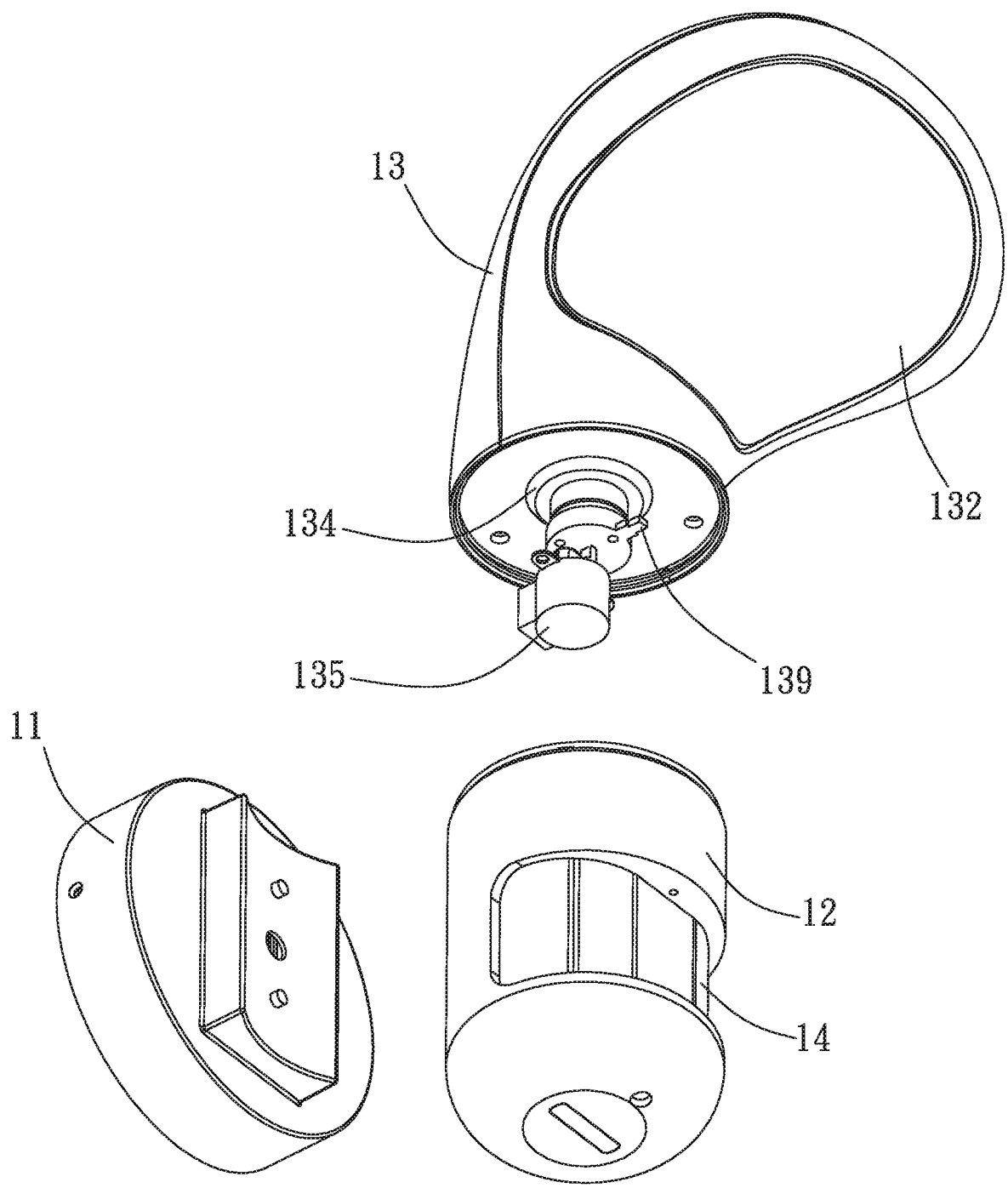
FIG. 2 is a partial exploded perspective view of the lamp in accordance with the preferred embodiment of the present invention.
Figure 3:
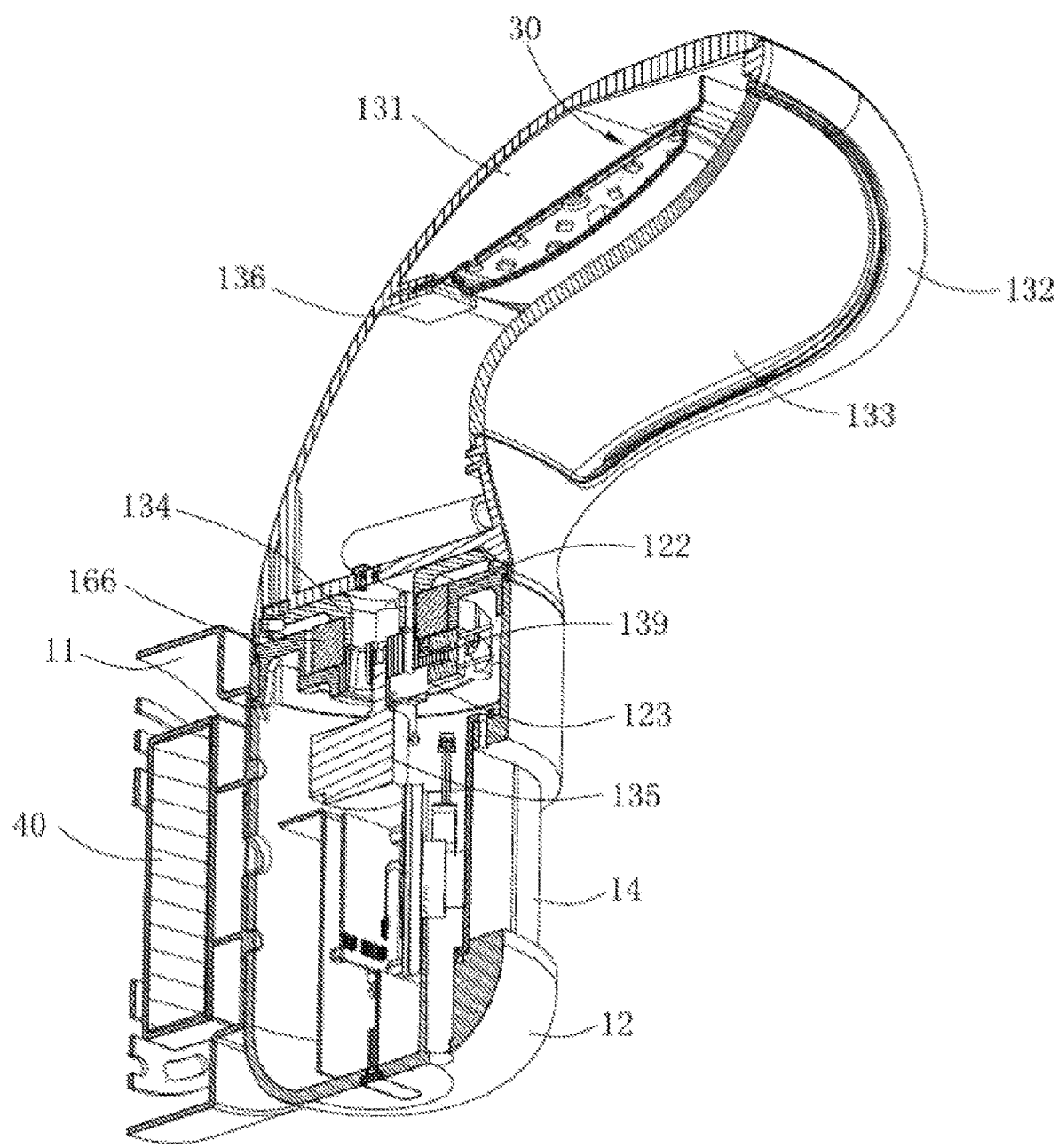
FIG. 3 is a perspective cross-sectional view of the lamp in accordance with the preferred embodiment of the present invention.
Figure 4:
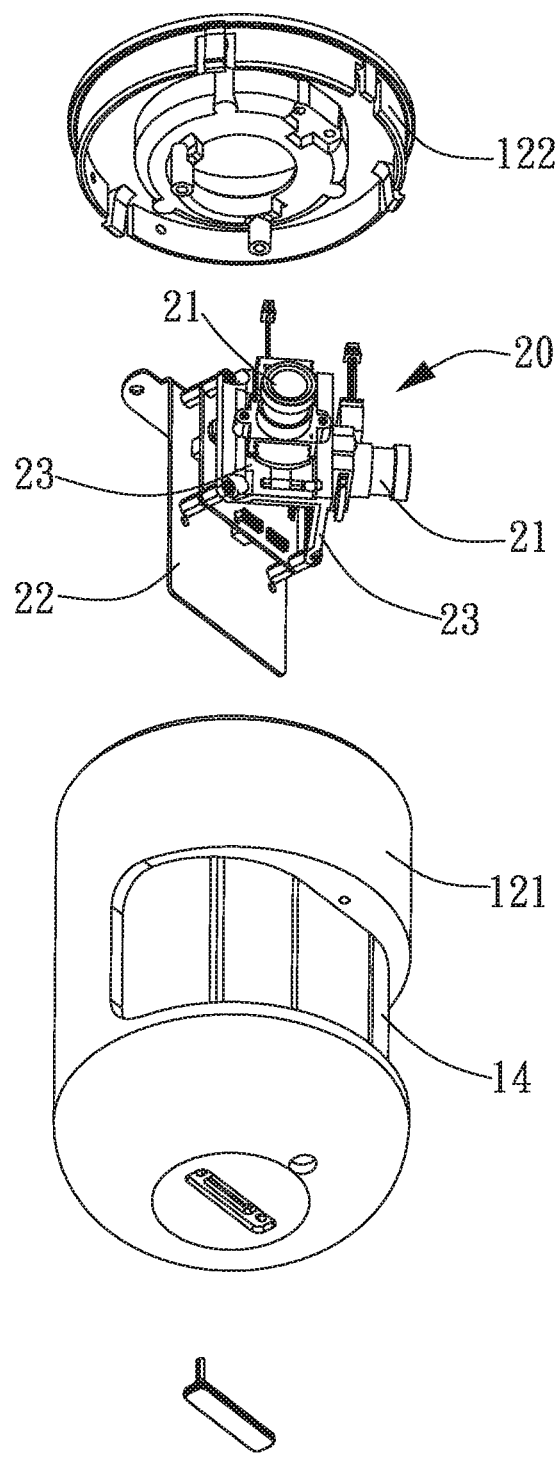
FIG. 4 is another partial exploded perspective view of the lamp in accordance with the preferred embodiment of the present invention.
Figure 5:
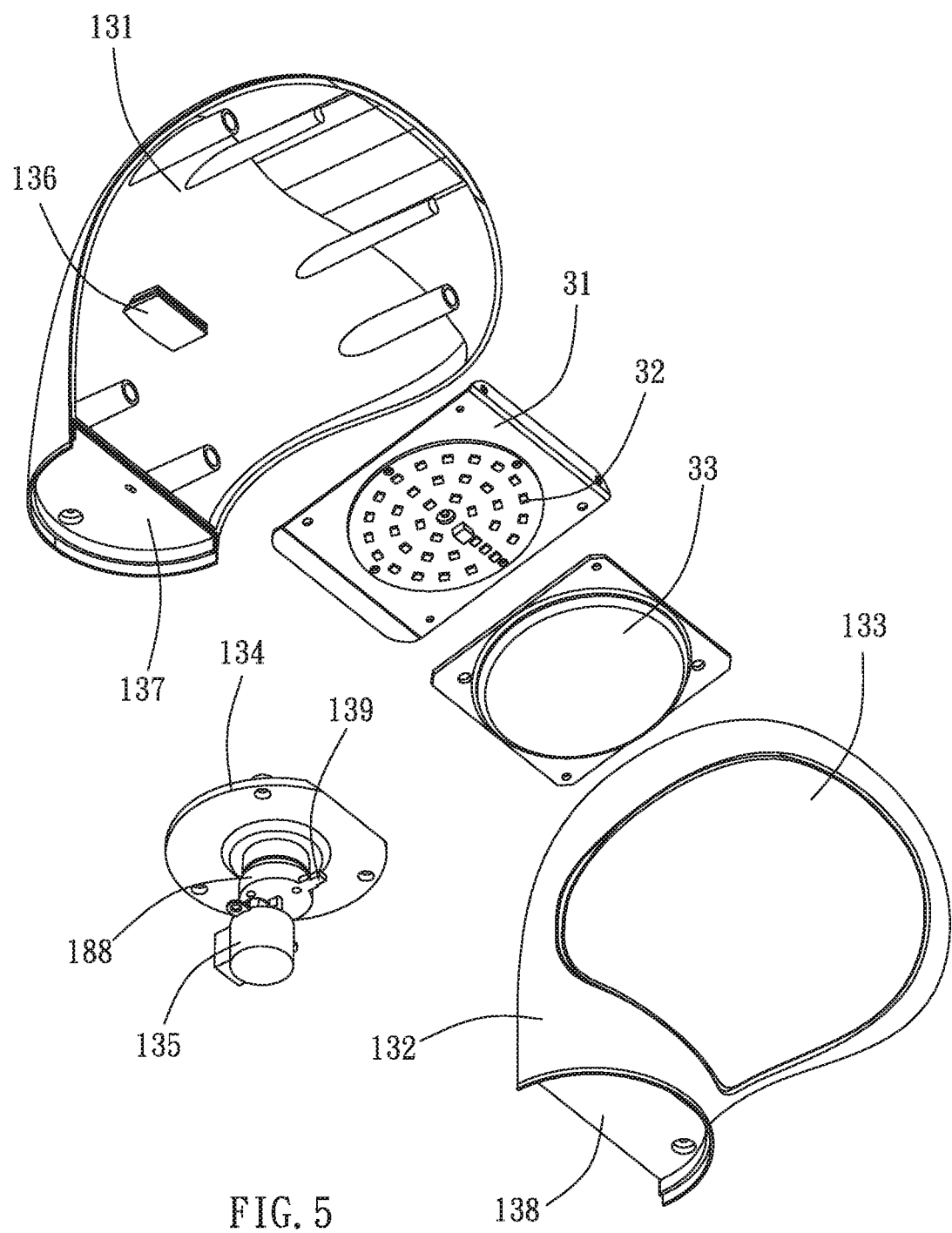
FIG. 5 is another partial exploded perspective view of the lamp in accordance with the preferred embodiment of the present invention.

Referring to the drawings and initially to FIGS. 1-5, a lamp in accordance with the preferred embodiment of the present invention comprises a housing 10, a camera (or a video device or an imaging system) 20, a lighting device 30, and a motor 135. The camera device 20, the lighting device 30, and the motor 135 are mounted in the housing 10.

The housing 10 includes a mounting portion 11 secured to a wall, a fixed unit 12 mounted on the mounting portion 11, and a rotation unit 13 rotatably mounted on the fixed unit 12 and rotatable relative to the fixed unit 12. The camera device 20 is mounted in the fixed unit 12 of the housing 10. The camera device 20 includes two camera heads 21 with an angle defined therebetween. The lighting device 30 is mounted in the rotation unit 13 of the housing 10.

In practice, when the camera device 20 detects movement of a human body or an object, the camera device 20 sends a message to trigger the lighting device 30 and the motor 135, such that the motor 135 is started to drive and move the rotation unit 13 of the housing 10. Thus, the lighting device 30 is rotated in concert with the rotation unit 13 of the housing 10, and is directed toward a moving direction of the human body or the object.

In the preferred embodiment of the present invention, the fixed unit 12 of the housing 10 includes a main shell 121 and an annular end cap 122 locked onto a top of the main shell 121. The main shell 121 and the annular end cap 122 form a receiving space, and the camera device 20 is mounted in the receiving space.

In the preferred embodiment of the present invention, the fixed unit 12 of the housing 10 further includes a transparent plate 14 mounted on the main shell 121. The main shell 121 has a face provided with a window located opposite to the mounting portion 11, and the transparent plate 14 is mounted in the window of the main shell 121. The camera device 20 is arranged corresponding to the transparent plate 14 and the window of the main shell 121.

In the preferred embodiment of the present invention, the camera device 20 further includes two mounting plates 23 with an angle defined therebetween, and two driving modules mounted on the two mounting plates 23 respectively. The two camera heads 21 are mounted on the two mounting plates 23 respectively, and are connected to the two driving modules respectively. The camera device 20 further includes a fixed plank 22 secured to the fixed unit 12 of the housing 10, and the two mounting plates 23 are mounted on the fixed plank 22. The lighting device 30 is connected with the two camera heads 21 of the camera device 20.

Thus, the two camera heads 21 of the camera device 20 have an automatically tracing function, such that when a human body or an object is moving and enters the monitoring field of the two camera heads 21, the two camera heads 21 trace the human body or object automatically and trigger the lighting device 30 which is turned on to emit light toward the human body or object. In such a manner, the two camera heads 21 enhance the surveillance range and precision.

In the preferred embodiment of the present invention, the lamp further comprises a power supply device 40 mounted in the mounting portion 11 of the housing 10, and electrically connected with the camera device 20 and the lighting device 30 by electric wires.

In the preferred embodiment of the present invention, the rotation unit 13 includes a rear shell 131, a front shell 132 combined with the rear shell 131, a light output portion 133 mounted on the front shell 132, and a base 134 mounted on the front shell 132. The front shell 132 and the rear shell 131 form a receiving chamber, and the lighting device 30 is mounted in the receiving chamber, and corresponds to the light output portion 133. The base 134 is located at a bottom of the rotation unit 13, and encloses the lighting device 30 in the rotation unit 13. The motor 135 is mounted on the bottom of the base 134.

In the preferred embodiment of the present invention, the rear shell 131 is provided with a locking block 136, and the lighting device 30 includes a top plate 31 secured to the locking block 136, a lamp holder 32 mounted on the top plate 31, and a lampshade 33 mounted on the top plate 31 and covering the lamp holder 32. The lamp holder 32 is provided with a plurality of lighting balls which emit light toward the light output portion 133.

In the preferred embodiment of the present invention, the motor 135 is mounted in the fixed unit 12 of the housing 10, and connected with the rotation unit 13 of the housing 10. The motor 135 is provided with a propeller shaft mounted on the base 134.

In the preferred embodiment of the present invention, the rear shell 131 has a bottom provided with a bottom board 137, and the front shell 132 has a bottom provided with a bottom board 138 juxtaposed to the bottom board 137 of the rear shell 131. The base 134 is mounted on the bottom board 137 of the rear shell 131 and the bottom board 138 of the front shell 132.

In the preferred embodiment of the present invention, the motor 135 is mounted on the annular end cap 122. A bearing 166 is mounted between the base 134 and the annular end cap 122. The annular end cap 122 is provided with a recess for mounting the bearing 166. A rotation piece 188 is mounted between the base 134 and the motor 135. The rotation piece 188 is provided with a sensor (or detector) 139. The annular end cap 122 is provided with a limit seat (or platform) 123. The rotation piece 188 is rotatably mounted on the limit seat 123. The motor 135 drives the rotation unit 13 which drives the lighting device 30, such that the rotation unit 13 and the lighting device 30 are rotated relative to the fixed unit 12.

In operation, when a human body or an object is moving and enters the monitoring field of the two camera heads 21, the two camera heads 21 trace the human body or object automatically and trigger the lighting device 30 and the motor 135, such that the lighting device 30 is turned on, and the motor 135 is started. In such a manner, the motor 135 drives the rotation unit 13 which drives the lighting device 30, such that the rotation unit 13 and the lighting device 30 are rotated simultaneously. Thus, the lighting device 30 is rotated and moved to correspond to movement of the human body or object, and emits light toward the human body or object to provide a positioning function.

Accordingly, the lamp uses the two camera heads 21 to replace the conventional infrared sensing device, so as to detect movement of the human body or object. In addition, the lamp is provided with a digital circuit to prevent an erroneous triggering, and to enhance the precision of detection. Further, the lamp is mounted indoors and outdoors.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A lamp comprising:
 a housing including a mounting portion secured to a wall, a fixed unit mounted on the mounting portion, and a rotation unit rotatably mounted on the fixed unit and rotatable relative to the fixed unit;
 a camera device mounted in the fixed unit, the camera device including two camera heads with an angle defined therebetween;
 a lighting device mounted in the rotation unit; and
 a motor configured to rotate the rotation unit;
 wherein when the camera device detects movement of an object, the camera device sends a message to trigger the lighting device and the motor, such that the lighting device is rotated toward a moving direction of the object.

2. The lamp of claim 1,
 the camera device further includes two mounting plates, and two driving modules mounted on the two mounting plates respectively, wherein the two camera heads are mounted on the two mounting plates respectively, and are connected to the two driving modules respectively.

3. The lamp of claim 1, further comprising a power supply device mounted in the mounting portion, and wires electrically connecting the power supply to the camera device and the lighting device.

4. The lamp of claim 1,
 the fixed unit of the housing includes a main shell and an annular end cap locked onto a top of the main shell, the main shell and annular end cap defining a receiving space, with the camera device mounted in the receiving space.

5. The lamp of claim 4,
the fixed unit of the housing further includes a face with a window located opposite the mounting portion, and a transparent plate mounted in the window, wherein the camera device is arranged corresponding to the transparent plate.

6. The lamp of claim 1,
the rotation unit includes a rear shell, a front shell combined with the rear shell, a light output portion mounted on the front shell, and a base mounted on the front shell and located at a bottom of the rotation unit, such that the lighting unit is enclosed in the rotating unit.

7. The lamp of claim 6, the lighting device includes a top plate, a lamp holder mounted on the top plate, and a lampshade mounted on the top plate and covering the lamp holder, and the top plate secured to the rear shell by a locking block.

8. The lamp of claim 6,
the motor provided with a propeller shaft mounted on the base of the rotation unit, the motor mounted in the fixed unit of the housing, and connected with the rotation unit of the housing.

\* \* \* \* \*